INVENTOR.
RAYMOND E. TRAFTON
BY M. Talbert Dick
ATTORNEY

Feb. 27, 1962 R. E. TRAFTON 3,022,516
FLUID VALVE MEANS FOR CONTAINERS
Filed Jan. 15, 1960 2 Sheets-Sheet 2
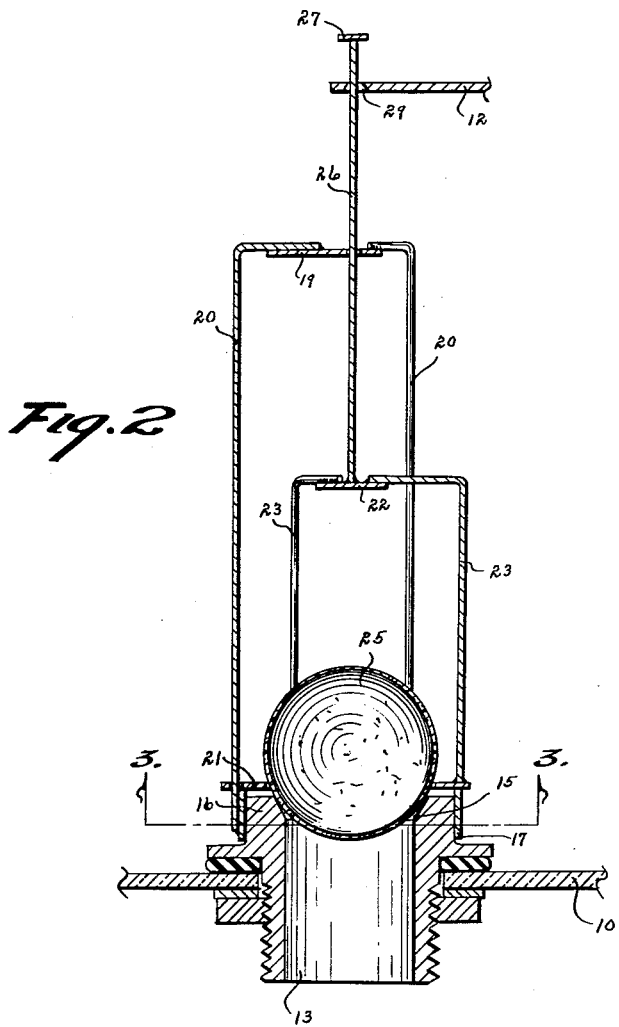
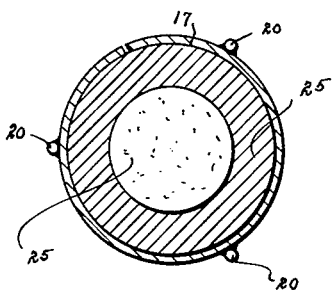
INVENTOR.
RAYMOND E. TRAFTON
BY M. Talbert Dick
ATTORNEY

United States Patent Office
3,022,516
Patented Feb. 27, 1962

3,022,516
FLUID VALVE MEANS FOR CONTAINERS
Raymond E. Trafton, Paton, Iowa
Filed Jan. 15, 1960, Ser. No. 2,761
5 Claims. (Cl. 4—56)

This invention relates to a fluid valve means and more particularly to a valve for use in toilet water tanks.

The valve assembly of all toilet water tanks is substantially identical. There is a vertical rod having a valve plug on its lower end, rod guide bearings, and a lever means for lifting the rod and valve plug from a closed position. With the exit of the water from the tank, the rod and valve plug is intended to automatically drop by gravity into a closed sealing position. However, because of the possible canting of the vertical rod, wear, rust or binding in its guide bearing, the rod often sticks, resulting in the valve plug remaining in elevated condition and the valve open. This malfunctioning of the valve assembly is most annoying, and a waste of water. Some effort has been made to correct this universal fault by spring means, but such springs quickly rust and soon render the valve means even less efficient than if the spring means had never been used. Obviously, the ideal valve for such purpose would be that of a rubber ball inasmuch as the rubber ball would be self-centering and self-sealing as the last of the water left the tank through the valve opening. Considerable attention has been given to such a structure but the problem was the removal of the ball from its seated engagement when it was desired to open the valve means. To solve this problem the first thought was to connect the ball by a chain to the operating lever. The difficulty, however, from such a structure was that not only would the chain become twisted, the ball handicapped in its free movement but there was ever present the possibility of the ball and chain getting wound around other elements within the tank such as its water entrance mechanism.

Therefore one of the principal objects of my invention is to provide a successful means utilizing a floatable rubber ball as the closing valve portion.

More specifically, the object of this invention is to provide a valve means of the ball type but wherein the ball is unattached and capable of freely rotating in all directions.

A further object of this invention is to provide a valve means for toilet tanks or like that has no springs.

A still further object of my invention is to provide a highly efficient valve means for toilet tanks or like that may be easily and quickly installed in toilet water tanks now in general use.

Still further objects of my invention are to provide a valve means that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 2 is a longitudinal sectional view of my valve means taken on line 2—2 of FIG. 1 and more fully illustrates its construction; and FIG. 3 is a cross-sectional view of the device taken on line 3—3 of FIG. 2.

Figure 1:
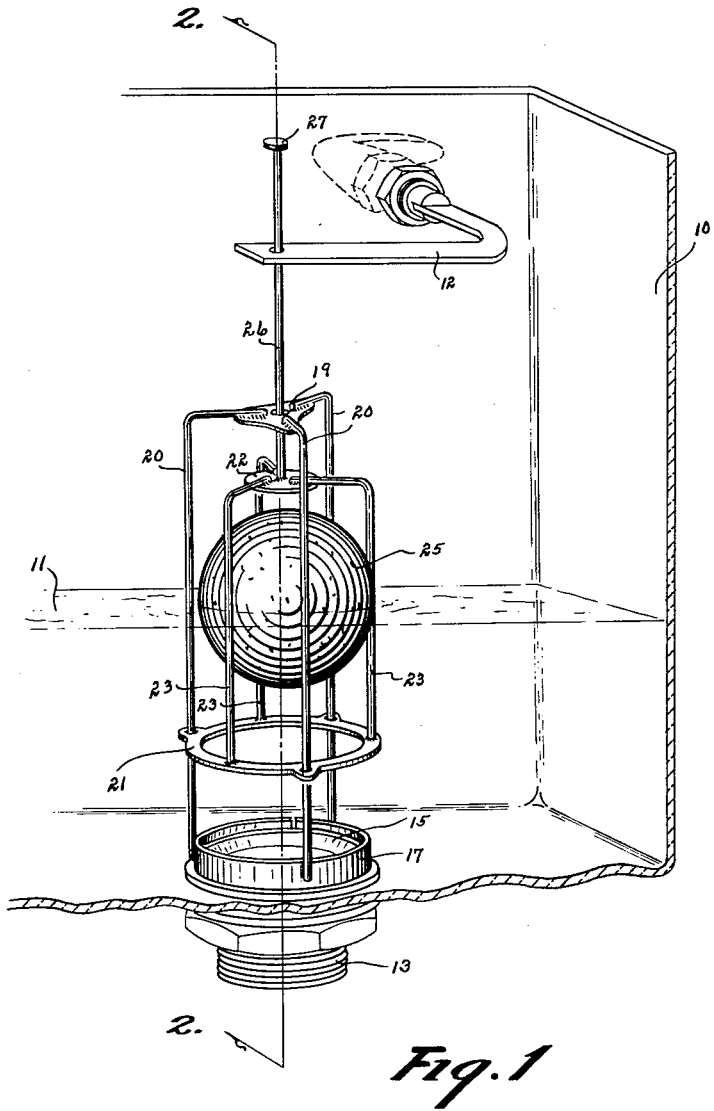
FIG. 1 is a perspective view of my device installed and with the ball valve portion in open condition.

In the drawings I have used the numeral 10 to designate a tank, container or like having the fluid 11 and the usual manually operated valve lifting lever 12 as shown in FIG. 1. In the bottom of such tanks is an outlet conduit 13 having the usual valve seat 15. These conduits extend upwardly within the bottom area of the tank and have a neck portion 16 as shown in FIG. 2. It is to such equipment that I install my device and which I will now describe in detail.

The numeral 17 designates a spring ring collar detachably embracing the neck 16. The numeral 19 designates a plate member. Extending between the collar 17 and plate 19 are two or more vertical guide rods 20. The numeral 21 designates a horizontal ring vertically slidably mounted on the rods 20. The inside diameter of this ring 21 is larger than that of the diameter of the circular valve seat 15. The numeral 22 designates a second plate positioned below the plate 19. The numeral 23 designates a plurality of vertical rods extending between the ring 21 and plate 22 as shown in FIG. 1. These rods 23 provide a cage or housing for the ball 25. It is recommended that this ball 25 be of flexible resilent material such as rubber or like and of a displacement weight less than that of the water 11 so as to be floatable. The cage housing produced by the rods 23 is of a diameter substantially greater than that of the diameter of the ball 25. The ball 25 has a diameter slightly greater than that of the inside diameter of the ring 21. The upper ends of the rods 23 are bent inwardly at their tops to contact the plate 22. These rods 23 are of such length to permit the ball 25 to move freely upwardly and downwardly within the case housing. In order to reduce the size of the plate 19, the upper ends of the rods 20 may also be bent inwardly to engage the plate 19. The numeral 26 designates a vertical rod having its lower end secured to the plate 22, its length slidably extending through the plate 19 and the upper portion where its length slidably extends through the lever arm 12. The numeral 27 designates a head stop on the upper end of the rod 26. The hole 29 in the actuating lever 12 and through which the rod 26 slidably extends, should be tapered downwardly and outwardly as shown in FIG. 2 to prevent any binding of the movable parts when the valve is manually actuated. The practical operation of the device is as follows: With water or fluid within a container, the ball will normally be seated in the valve seat 15 as shown in FIG. 2. By manually moving the lever 12 upwardly the rod 26 will be thereby elevated. The elevating of the rod 26 will move the ring 21 upwardly and inasmuch as the inside diameter of this ring is slightly less than that of the diameter of the ball, the ball 25 will be lifted from its valve seat 15 and immediately with the valve seal broken the floatable ball 25 will float upwardly and free of the valve seat thereby letting the water or like move downwardly through the conduit 13. Once the valve seat is so broken the lever 12 may be released inasmuch as the floatable ball will remain elevated from the valve seat until substantially all of the water in the tank has passed therefrom. The ball 25 is permitted considerable movement within the cage and may freely rotate and move about within its cage. With the ball cage released and lowered, the floatable ball, as the last of the water drains from the container, will be guided by gravity and by the passing water directly into the valve seat 15. Thus the free ball 25 will automatically self-center into the valve seat. Because the ball could rotate and does rotate, it will seldom be consecutively in the same rotary position. For this reason, any and all surfaces of the ball will be used over a given period of time and will therefore wear evenly. By the use of my device I am able to utilize the advantages of a floatable ball as the movable part of a valve without the problem of direct connection with the ball such as a chain or like and remove it from its valve seat. From experimentation I find that my valve means will work over a long period of time without a single failure. The various parts of my device except the ball portion may be made of any suitable non-rusting material such as non-rusting metal, plastic or like.

Some changes may be made in the construction and arrangement of my fluid valve means for containers without departing from the real spirit and purpose of my invention, and it is my intention to cover by my claims, and modified forms of structure or use of mechanical equivalents which may be reasonably included within their scope.

I claim:

1. In a valve means, a base member having a valve seat, a collar detachably embracing said valve seat, three equidistant post rods extending upwardly from the annular periphery of said collar, a cage means distinct from said post rods, said cage vertically slidably mounted on and interior of the area prescribed by said post rods, a ring in the bottom of said cage, a ball contained free in said cage having a diameter greater than that of the inside diameter of said ring and capable of seating in said valve seat when said cage is in a lowered position of its sliding movement, and a means for facilitating the upward sliding movement of said cage.

2. In a valve means, a base member having a valve seat, a detachable spring collar embracing said valve seat, three equidistant post rods extending upwardly from the annular periphery of said collar, a cage means distinct from said post rods, said cage vertically slidably mounted on and interior of the area prescribed by said post rods, a ring in the bottom of said cage, a ball contained free in said cage having a diameter greater than that of the inside diameter of said ring and capable of seating in said valve seat when said cage is in a lowered position of its sliding movement, and a means for facilitating the upward sliding movement of said cage.

3. In a valve means, a base member having a valve seat, a collar detachably embracing said valve seat, three equidistant post rods extending upwardly from the annular periphery of said collar, a cage means distinct from said post rods, said cage vertically slidably mounted on and interior of the area prescribed by said post rods, a ring in the bottom of said cage, a fluid floatable ball contained free in said cage having a diameter greater than that of the inside diameter of said ring and capable of seating in said valve seat when said cage is in a lowered position of its sliding movement, and a means for facilitating the upward sliding movement of said cage, said cage having an inside diameter substantially greater than that of the diameter of said ball.

4. In a valve means, a base member having a valve seat, a collar detachably embracing said valve seat, three equidistant post rods extending upwardly from the annular periphery of said collar, a cage means distinct from said post rods, said cage vertically slidably mounted on and interior of the area prescribed by said post rods, a ring in the bottom of said cage, a fluid floatable ball contained free in said cage having a diameter greater than that of the inside diameter of said ring and capable of seating in said valve seat when said cage is in a lowered position of its sliding movement, and a means for facilitating the upward sliding movement of said cage, said cage being vertically elongated and having an inside diameter substantially greater than that of the diameter of said ball.

5. In a valve means, a base member having a valve seat, a detachable split spring collar embracing said valve seat, three equidistant post rods extending upwardly from the annular periphery of said collar, a cage means distinct from said post rods, said cage vertically slidably mounted on and interior of the area prescribed by said post rods, a ring in the bottom of said cage, a ball contained free in said cage having a diameter greater than that of the inside diameter of said ring and capable of seating in said valve seat when said cage is in a lowered position of its sliding movement, and a means for facilitating the upward sliding movement of said cage, said cage being vertically elongated and having an inside diameter substantially greater than that of the diameter of said ball.

References Cited in the file of this patent

UNITED STATES PATENTS

| 551,475 | Powell | Dec. 17, 1895 |
| 2,189,345 | Hillegas | Feb. 6, 1940 |
| 2,257,292 | De Carmo | Sept. 30, 1941 |
| 2,895,141 | Curran | July 21, 1959 |

FOREIGN PATENTS

| 30,207 | Great Britain | of 1897 |